Figure 4:
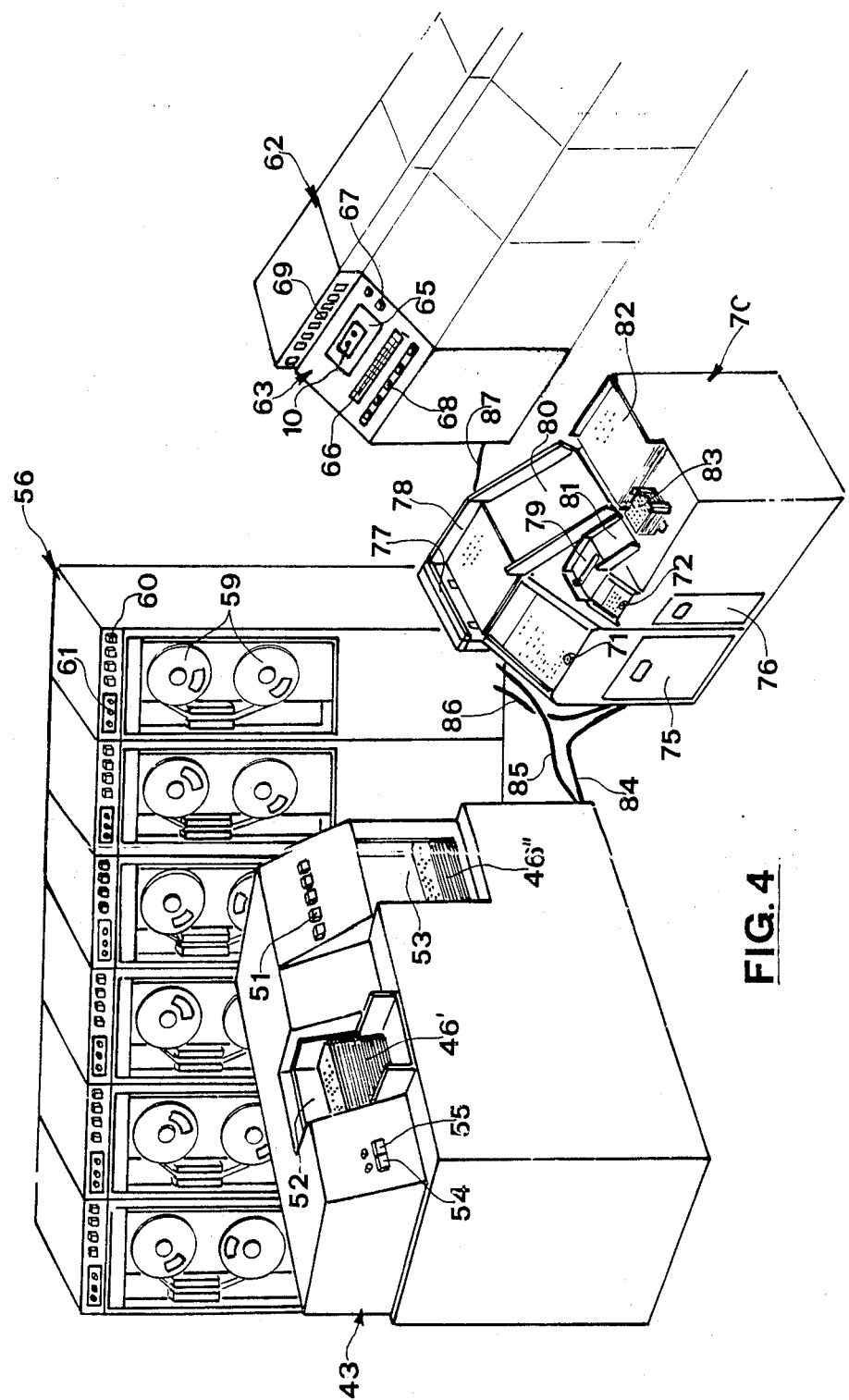

United States Patent [19]

Massari

[11] Patent Number: 4,786,983
[45] Date of Patent: Nov. 22, 1988

[54] SYSTEM FOR RECORDING ONE'S OWN VOICE ON TAPES ALREADY RECORDED WITH MUSICAL ACCOMPANIMENTS

[76] Inventor: Berardo Massari, Via Gramsci 76, Rozzano (Milano), Italy

[21] Appl. No.: 379,577

[22] Filed: May 17, 1982

[30] Foreign Application Priority Data

Jul. 13, 1981 [IT] Italy .............................. 22892 A/81
Apr. 21, 1982 [IT] Italy .............................. 21637/82[U]

[51] Int. Cl.[4] .............................................. G11B 5/86
[52] U.S. Cl. ......................................... 360/13; 360/15
[58] Field of Search ............................. 360/13, 15, 60

[56] References Cited

U.S. PATENT DOCUMENTS

| | | |
|---|---|---|
| 3,223,790 | 12/1965 | Brandt .................................. 360/13 |
| 3,990,710 | 11/1976 | Hughes ................................. 360/15 |
| 4,095,261 | 6/1978 | Rodriquez ............................. 360/13 |
| 4,121,262 | 10/1978 | Ushio et al. ........................... 360/13 |
| 4,122,500 | 10/1978 | Bradford et al. ...................... 360/13 |
| 4,141,045 | 2/1979 | Sheehan ................................ 360/15 |
| 4,227,220 | 10/1980 | Brown et al. ......................... 360/15 |
| 4,249,218 | 2/1981 | Davis et al. ........................... 360/13 |

Primary Examiner—Vincent P. Canney
Attorney, Agent, or Firm—Michael J. Striker

[57] ABSTRACT

A system of recording and playing cassettes consisting of a double-track tape, one track on which the musical accompaniment has been recorded being unerasable and the other clean so that the user can record his own voice on it accompanied by the recorded music.

1 Claim, 3 Drawing Sheets

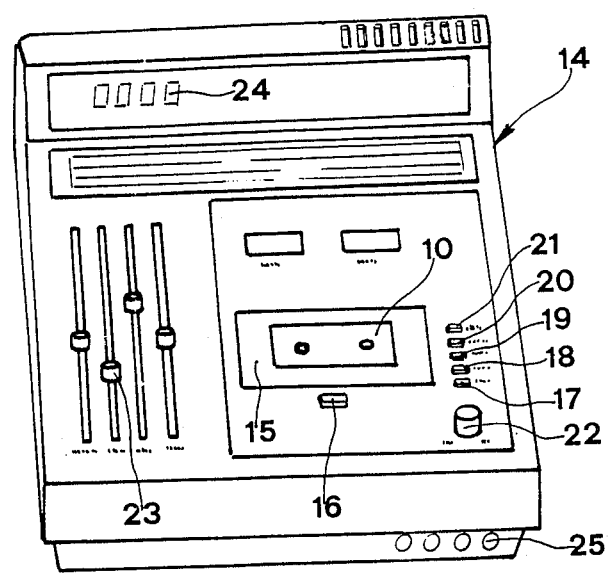
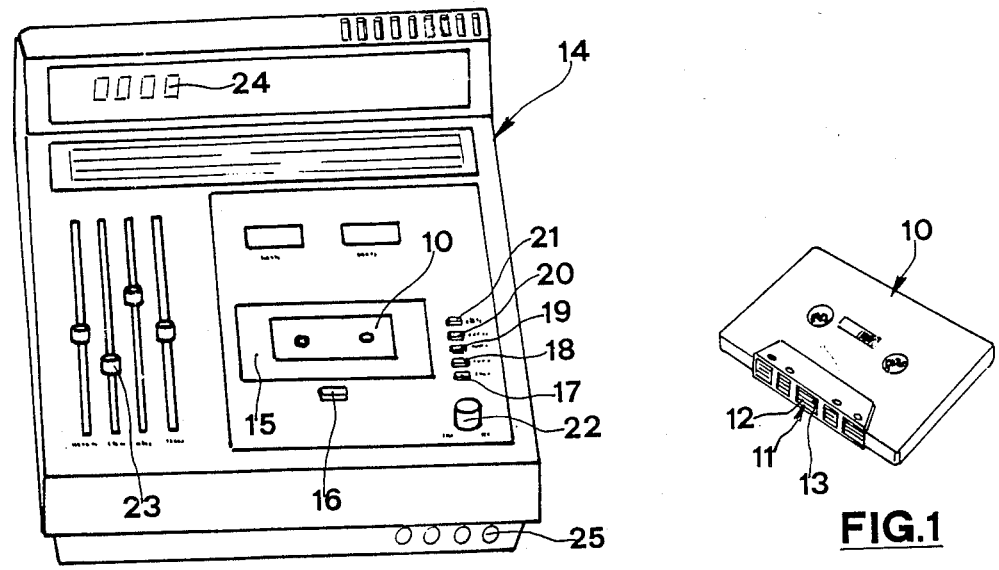
FIG.1
FIG.2
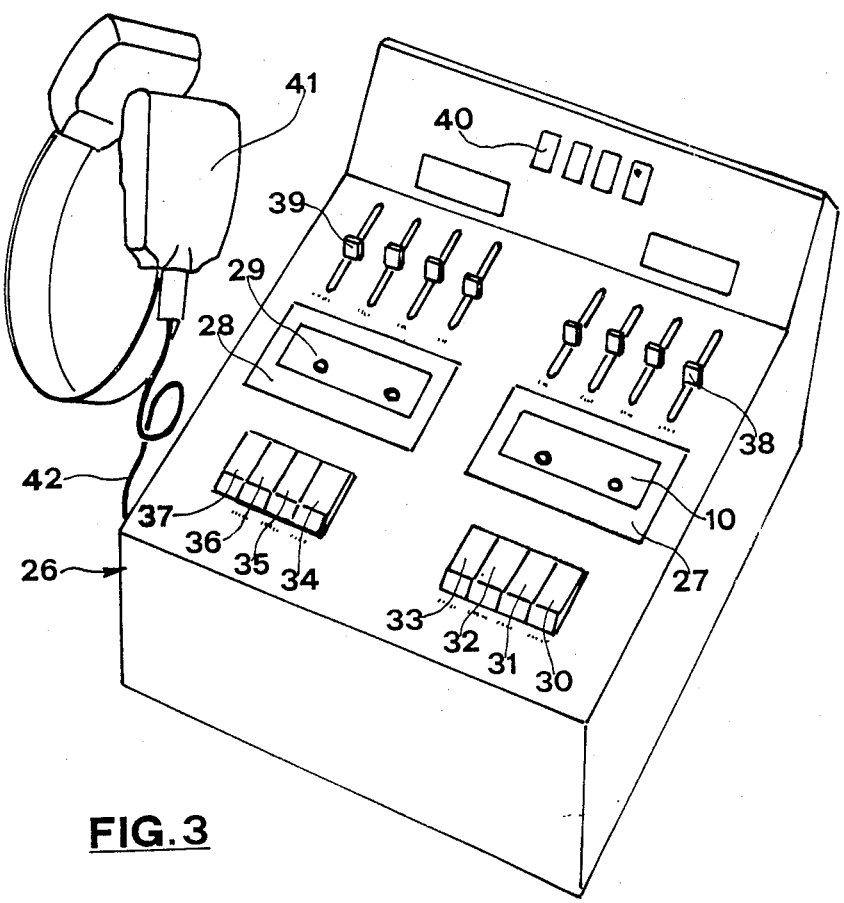
FIG.3

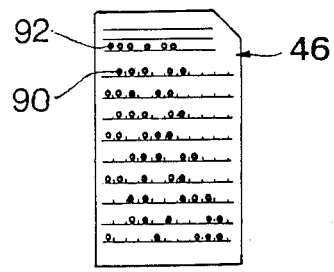
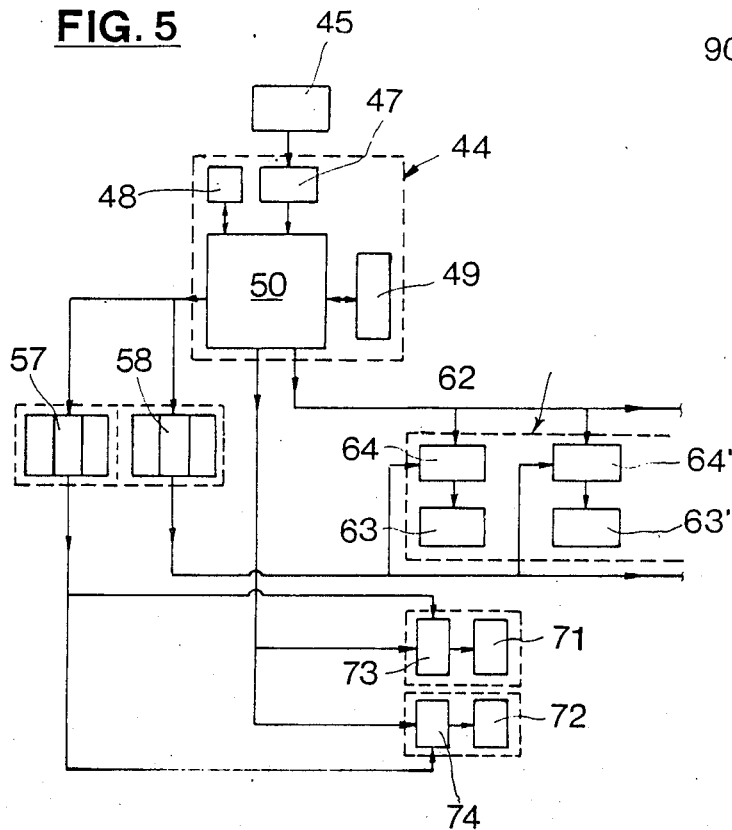
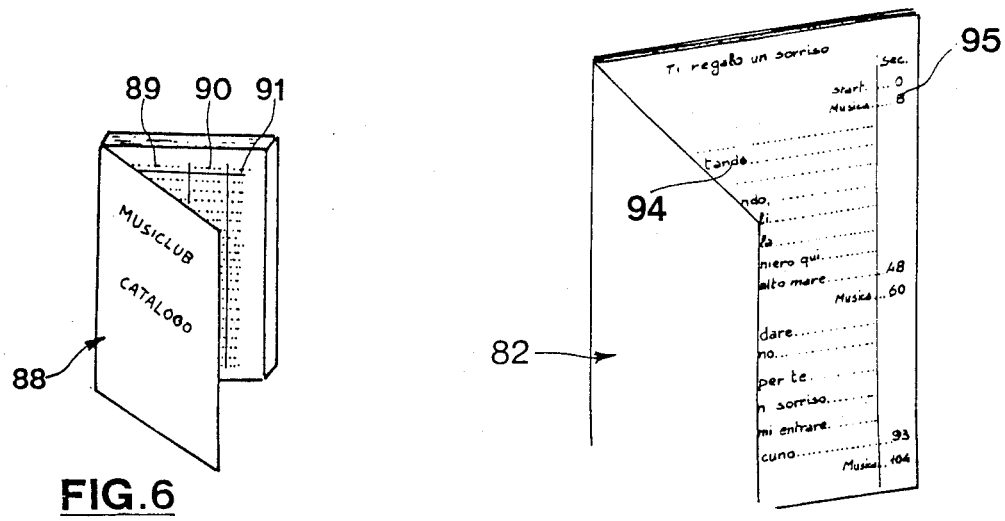

SYSTEM FOR RECORDING ONE'S OWN VOICE ON TAPES ALREADY RECORDED WITH MUSICAL ACCOMPANIMENTS

The so-called cassettes, for reproduction of a certain number of musical pieces recorded on tapes, are universally known.

It frequently happens that a person would like to record his own voice benefitting from a musical accompaniment similar to those available for celebrated singers. Unfortunately, however, it is almost impossible for an amateur to have access to the same means accorded to a professional; at the most he will have to record his voice without an accompaniment, or with an improvised and probably unsatisfactory one.

The purpose of this invention is to provide a system for recording a person's voice on a cassette or similar device, accompanied by the original music, namely with the accompaniment which a professional singer normally has.

The subject of the invention is a cassette having a tape with two tracks; one, on which the accompaniment is recorded, is non-erasable while the other track is free for recording the singer's voice accompanied by the original music.

Each cassette can include the words of the songs to go with the recorded accompaniment, with indication of the points where the singer's voice comes in or stops.

The user purchases the double-track tape, puts it into suitable reproducing equipment and, following the words provided together with the tape, records his own voice on the second track.

The system described also envisages a double-playing reproducer: one place for "complete" tapes, namely those recorded with the voice of the professional singer accompanied by instuments, an orchestra, etc., and the other place for the tape recorded with the musical accompaniment only.

It is thus possible to listen, with or without a headset, to the original singer and simultaneously record one's own voice and then compare the two versions.

The music recorded on each tape containing the accompaniment only must be exactly the same as that recorded on the "complete" tape, the only difference between the two tapes-the complete one and the other with accompaniment only-being that the second one has no singing voice. The "complete" tape can be supplied by the producer to the user with or without the tape containing the accompaniment only.

A perfection to the invention consists in preparation and sale of "personalized" tapes, namely ones on which a chosen piece is recorded as accompaniment on a two-track tape, following placing of a specific order by the user to satisfy his personal desire.

The producer makes use of an automatic recording system which includes a store containing a certain number of musical pieces, naturally chosen from among those likely to be in greatest demand and of a topical nature.

The user can choose from among the pieces available in a catalogue published by the producer.

The catalogue lists the titles of the accompaniments available, these of course being chosen from among pieces used for accompanying professional singers, the names of those playing the music and of the choir if any, the specific code number for each title, the time taken for playing the whole tape and for each single piece.

The system for recording the musical accompaniments includes the central memory store, a computer with a punched card reading unit, the equipment for recording the tapes, the machines which print the words of the song and the labels to affix to the cassettes.

The computer includes a transit memory unit, a logic-mathematical unit, a unit constituting the working memory and a further one for control and operation.

The central memory store operates by a set of magnetic tape disks, or their equivalent, and these are recorded, in accordance with their codes, with all the pieces shown in the catalogue, together with all the words of the songs having these musical accompaniments and with all the data needed for controlling the recordings.

The recording equipment comprises a series of decks for recording cassettes, each of which is connected to a peripheral memory.

In accordance with orders received from the computer, the printers print, in the same sequence, the words of the songs corresponding to the accompaniments and the labels to affix to the cassettes.

The user chooses from the catalogue those pieces whose musical accompaniments he wants to have recorded on a single cassette and gives the producer the code number, by letter or by some other means; the producer then makes up a punched card for this order and places it in the reading unit.

The computer reads the data and on this basis operates the peripheral memories connected to the recording units and to the printers which, respectively, then record the accompaniments on the tape, as requested by the user, and print the words and the labels for these accompaniments.

The personalized tape with its musical accompaniment is delivered to the user together with the words of the song and, if requested, also with an ordinary tape recorded with the voice of the professional singer chosen accompanied by exactly the same music.

The user, making use of a single or double-track reproducing instrument, can complete the tape with his own voice "guided" by the voice of the professional singer.

The characteristics and the purposes of the invention will be made still clearer by the following examples of its realization illustrated by drawings.

FIG. 1: A double-track cassette.
FIG. 2: A player and recorder.
FIG. 3: A player and recorder for two cassettes.
FIG. 4: A set of recording and printing equipment for double-track cassettes with "personalized" musical accompaniment.
FIG. 5: Layout of the principal equipment.
FIG. 6: Catalogue.
FIG. 7: Punched card.
FIG. 8: Book of words.

FIG. 1 shows the casette (10), with a double-track magnetic tape (11).

The musical accompaniment is unerasably recorded on the first track (12) while the other track (13) is clean for recording the user's voice.

The recorder-player deck (14) can be seen in FIG. 2. The following are visible on the surface of the deck: the cassette-holder (15), the button (16) for cassette expulsion, the button switch (18) for playback, the button switch (19) for fast-forward, the button switch (20) for fast return, the button switch (21) for pause, the on-off switch (22), the selectors (23) for the level of recording and playback, the display (24), the sockets (25) for headset, amplifier and microphone.

FIG. 3 shows a deck (26) with two recording positions. In the first cassette-holder recess (27) the cassette (10) with double-track tape can be placed, while in the second recess (28) an ordinary cassette (29) can be placed. The set of button switches 30–33 simultaneously carries out the following functions for both cassettes: fast-forward (30), fast return (31), pause (32) and expulsion (33).

The button switches (34), (35) are used for playing back the first cassette (10) and for recording the second one, or vice versa. Switches (36), (37) select playback of one of the two cassettes. Selectors (38), (39) regulate the level of recording and playback for the two cassettes. The display (40) is synchronized with recording. The headset (41) is connected by cable (42) to the deck (26).

FIG. 4 shows the equipment for recording musical accompaniments on the cassettes (10') and FIG. 5 is a diagram of the general layout.

The cabinet (43) contains the computer (44) and the reading unit (45) for the punched cards (46). (See also FIG. 7.)

The computer (44) consists of: the transit memory (47), the logic-mathematical unit (48), the working memory (49) and the drive and control unit (50).

The set of pilot lights (51) enables the operative stages to be followed from the outside. The reading unit (45) has two compartments (52), (53) respectively for the incoming cards (46') and the outgoing cards (46''); this unit is hand operated by the selectors (54) and (55).

The cabinet (56) comprises two sets of memories (57) and (58). (See FIGS. 4 and 5.) The first set (57) contains the words of the songs and the second one (58) the musical accompaniments. The sets of memories are built up of magnetic disks (59).

The manual controls (60) and the pilot lamps (61) showing the operative stages are visible on the outside. The peripheral cabinet (62) consists of a set of decks (63) and (63') for recording the cassettes (10) and of a set of units (64), (64') constituting the peripheral memories.

On the upper surface of the deck (63) there are: the slot (65) for holding the cassettes (10) to be recorded, the display (66) for controlling recording, the button switches (67), (68) for moving the cassette and the display (69) on which the customer's code appears.

Another cabinet (70) houses two printers (71), (72) and two units (73), (74) constituting the peripheral memories. The following are visible from the outside: the two load points (75), (76) for paper, the binding strip (77), the two intermediate levels (78), (79), the two slides (80),(81), the completed booklets (82) and the labels (83) to stick onto the cassettes. The various structures are connected by cables (84) and (87).

The way the system functions is clear.

In the catalogue (88) the titles (89) of the accompaniments are listed alphabetically and, for each one, the code number (90) and playing time (91) in seconds.

Having chosen his songs from the catalogue, the user sends in his order to the manufacturer who makes and sells the cassettes, and he has a punched card (46) prepared accordingly (See FIG. 7). This card will be punched with the customer's code (92) and with the codes (90) of the requested musical accompaniments.

The cards (46) are collected and processed by the machines arrangement of which is shown in FIG. 5. The reading unit (45) takes the data off the cards (46) and sends it straight to the transit memory (47). This memory is controlled by unit (50) which, with the aid of the other two units—the logic-mathematical unit (48) and the working memory (49)—makes a search in the central memory units (57), (58) for the words and related musical accompaniments.

For each group of titles to be recorded in each single cassette, unit (50) transmits to units such as (64), (64') and (73), (74) in the peripheral memory, the accompaniments to be recorded on the cassette (10), the words for making up the booklets (82) and the titles to be printed on the labels (83).

The customer's order code (92) appears on the display (69) of the recording decks (63) and this code is printed on the word booklets (82) and on the labels (83).

By inserting the cassettes (10) and (10') into the recorder (14), and by using the booklets (82) (see FIG. 8) in which the words (94) are printed and which indicate the times (95) when the singer is singing, the user is in possession of everything needed to record his own voice.

By switching on the recorder (14 in FIG. 2) and the button switch (17) for playing and recording, the accompaniment can in fact be heard on the unerasable track (12) while recording of the user's voice is in progress on the other track (13) of the cassette (FIG. 1).

The times (95) when the singer is singing (FIG. 8) can easily be followed on the digital clock (24) on the recorder (FIG. 2).

The recorder (26) enables playback to be made of the pieces already recorded on the cassette (29) with the professional singer's voice, to be heard through the headset (41) while recording is in progress.

The advantages of the invention are evident.

Anyone can sing the various songs himself accompanied by the music used for his favourite professional singer. By using a player for two cassettes an exact comparison can be made between the amateur's rendering and that of the professional singer and the amateur can thereby learn easily and quickly.

As the applications of the invention are here described merely as examples without limiting them to these, it is understood that any equivalent application of the inventive concepts explained and any present and/or operating product functioning in accordance with the characteristics of the invention will be covered by its field of protection.

What is claimed is:

1. System enabling a user to record on commercial cassette tapes his voice accompanied by music, particularly music accompanying the voice of a well-known professional singer, already recorded by the manufacturer, comprising recording means which enables the manufacturer to produce cassettes with dual-track tapes, so that the first track is recorded by the manufacture with musical accompaniments of songs, and the second track is left blank thereby allowing the user to repeatedly record his own voice singing along with the musical accompaniment recorded on the first track; and reproducing/recording equipment for the dual-track cassette tapes which enables the user to play back the musical accompaniment of the first track and simultaneously record his voice on only the second track; and Wherein said reproducing/recording equipment includes an arrangement receiving two cassettes, said arrangement including one recess for holding an ordinary commercial complete one track cassette recorded with the musical accompaniment and the professional singer's voice, and another recess for holding the dual-track cassette tape on which only the accompaniment is recorded, said arrangement thereby making it possible to hear simultaneously the original rendering and the user's voice on the second track so that an immediate comparison can be made between the two renderings.

* * * * *